May 2, 1961 S. CROOKS ET AL 2,982,023
FLAYING KNIFE TO REMOVE THE SKIN FROM CATTLE AND THE LIKE
Filed Dec. 16, 1958 3 Sheets-Sheet 1
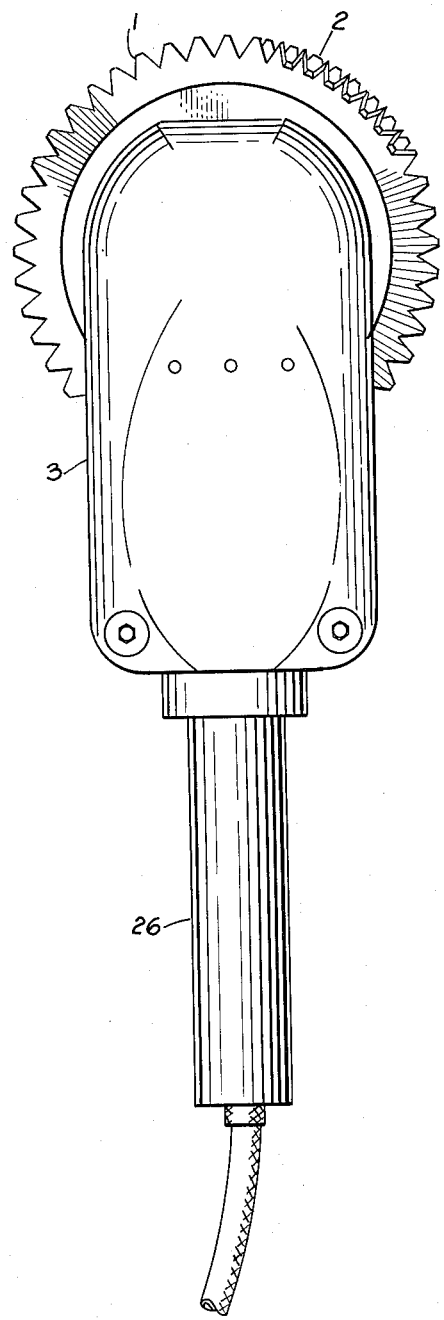
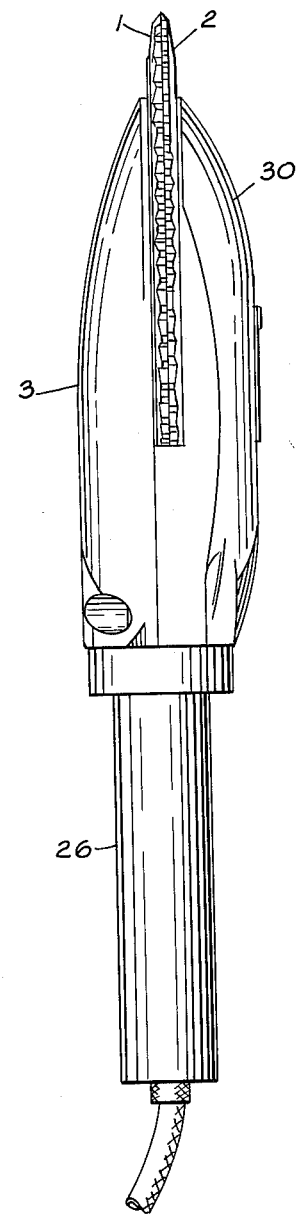
INVENTORS:
SAM CROOKS
ALEXANDER H. BURNETT
BY
ATT'Y

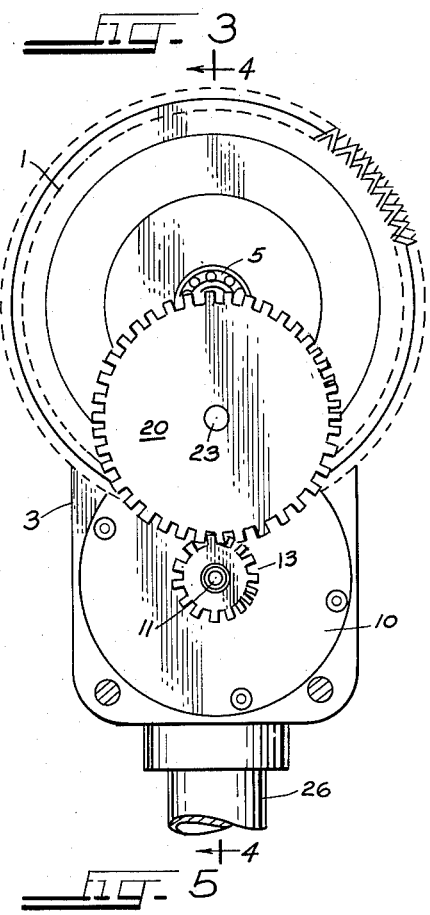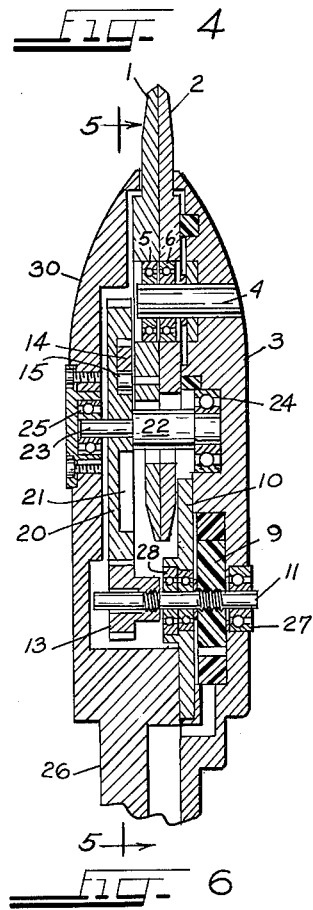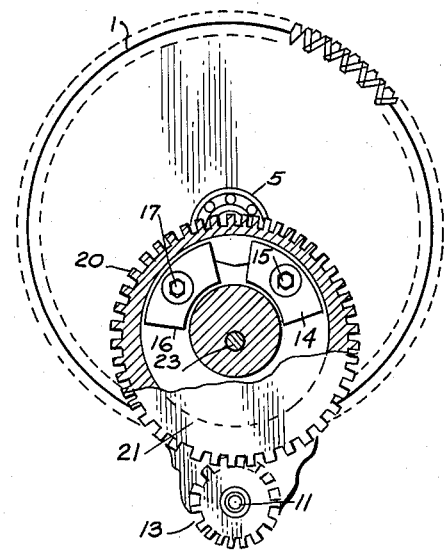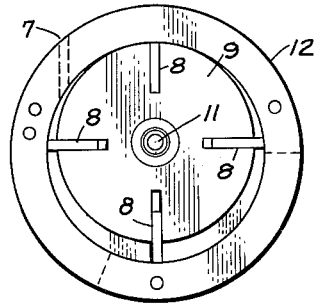
INVENTORS
SAM CROOKS
ALEXANDER H. BURNETT

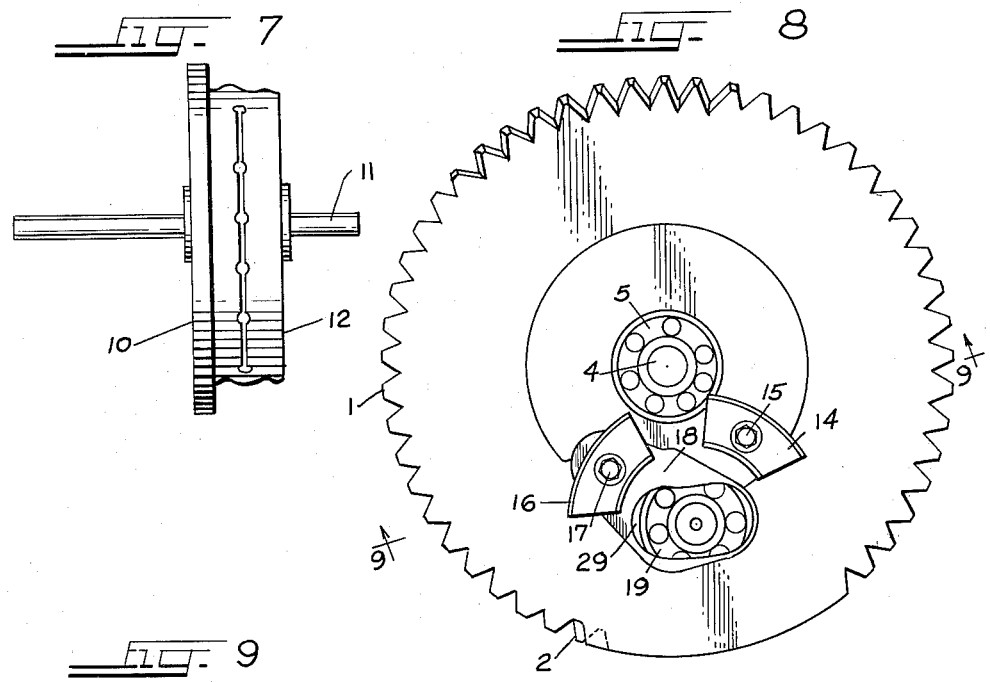
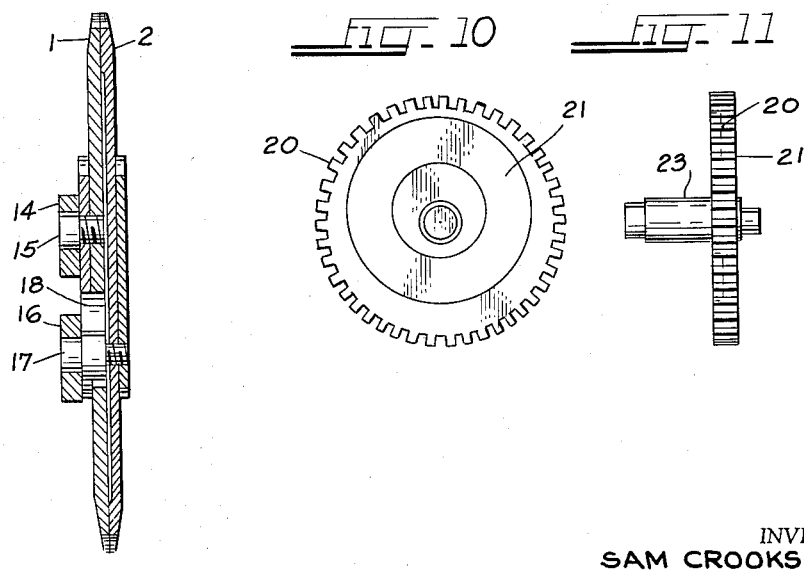

United States Patent Office 2,982,023
Patented May 2, 1961

2,982,023

FLAYING KNIFE TO REMOVE THE SKIN FROM CATTLE AND THE LIKE

Sam Crooks, 12302 71st Ave., Palos Heights, Ill., and Alexander H. Burnett, 11470 S. Bell Ave., Chicago 43, Ill.

Filed Dec. 16, 1958, Ser. No. 780,700

5 Claims. (Cl. 30—216)

This invention relates to an air-driven knife for removing the skin from cattle and the like in which the driving means are located in the head of the assembly and the axis of the driving gear is disposed so as to be parallel to the axis of the cutting blades and which is designed so as to be less complex in mechanical construction and yet more durable than those knives which have heretofore been commercially employed for this purpose.

Various knives have been proposed for removing the skin from cattle and some of these utilize air-driven turbines to actuate the cutting blades as does the invention to be described herein. However, in the air-driven knives previously proposed the air turbine is located in the handle such that its axis is parallel to the axis of the handle and perpendicular to the axis of the cutting blades. These knives utilize complex speed reducers since the desired speed of oscillation for the cutting blades is considerably less than the optimum speed of rotation of the turbine and because the axis of rotation of the cutting blades is perpendicular to that of the turbine. These knives also utilize complex mechanical means of connecting the driving gear to the cutting blades so as to oscillate the latter, which means have proved to be subject to frequent mechanical failure resulting in high maintenance costs. Thus while some of the knives previously proposed will, when in the proper operating condition, produce satisfactory results, yet they are subject to at least two serious objections. First, they are composed of many complex, precision made parts which are expensive to manufacture. Secondly, they are so lacking in durability that they are subject to frequent mechanical breakdowns and are thus expensive to maintain in operation. This latter disadvantage is so serious that many in the industry now prefer to use manual rather than air-driven knives because of the low cost of maintenance and durability of the former. For example, the O'Neilly Patent No. 2,565,878 discloses a skinning tool, now in commercial use, which is driven by an air turbine located in the handle such that the axis of rotation of the turbine and of the driving gear are perpendicular to the axis of rotation of the cutting blades. This device utilizes many complex, precision-made components including an intricate speed reducer to obtain the desired cutting speed. This device further utilizes a means of connecting the driving gear to the cutting blades which is highly susceptible to mechanical failure as compared to the flaying knife embodying the present invention to be hereinafter described.

The primary object of the present invention is to provide a flaying knife in which the driving means are located in the head of the device rather than in the handle and such that the driving gear is disposed in a plane parallel to the plane of the cutting blades so as to produce a knife which is simple in mechanical construction and yet highly durable so as to be able to withstand the rugged use to which such knives are subjected in commercial use.

Another object of this invention is to provide a flaying knife in which the means of connecting the driving gear to the cutting blades so as to oscillate the latter are simple in mechanical construction, highly durable in operation and such as to provide smooth, even operation with a minimum of vibration.

A further object of this invention is to provide a flaying knife in which the means to connect the power shaft to the cutting elements are adapted so as to function as a speed reducer and thus provide the desired speed of oscillation of the cutting elements.

A still further object of this invention is to provide a flaying knife which utilizes a comparatively small number of parts of comparatively large size and yet which has a total weight substantially equal to knives of a similar type now in use.

These and other objects and advantages of the invention will be apparent from the following description thereof, taken in conjunction with the accompanying drawings in which:

Fig. 1 is a front elevational view of the complete knife assembly.

Fig. 2 is a side elevational view of the complete knife assembly.

Fig. 3 is a front elevational view with the front cover plate removed, so as to illustrate the location of the air turbine and the means of connecting the turbine to the cutting elements.

Fig. 4 is a sectional view taken along the line 4—4 of Fig. 3.

Fig. 5 is a sectional view, partly broken away, taken along the line 5—5 in Fig. 4 and illustrating in particular the means of connecting the driving gear to the cutting elements.

Fig. 6 is a top plan view of the air turbine.

Fig. 7 is a side elevational view of the air turbine.

Fig. 8 is a front elevational view illustrating the shape of the cutting elements and showing the shoes or cam followers attached thereto.

Fig. 9 is a side elevational view of the knife elements taken along the line 9—9 in Fig. 8.

Fig. 10 is a detail drawing of the gear-cam illustrating in particular the eccentric, annular track which is cut into one face of said gear.

Fig. 11 is a side, elevational view of the gear-cam shown in Fig. 10.

Referring to Figures 1 and 2 it will be seen that the cutting elements consist of two flat circular discs 1 and 2 with cutting teeth provided around their peripheries and arranged face to face in the head 3 of the assembly. These cutting elements 1 and 2 are both mounted on the same shaft 4 by means of roller bearings 5 and 6 and the shaft 4 is mounted in the head 3 so as to be stationary therein. (see Fig. 4). The cutting elements 1 and 2 are free to rotate about the shaft 4 independently of each other as will be more fully explained hereinafter.

The knife being described herein is operated by means of an air turbine which is shown in Fig. 6 with the cover removed so as to illustrate the moving parts therein. The air is forced in through the hollow handle 26 (see Fig. 4) and air inlet 7 so as to strike the turbine blades 8 seriatim and thus impart a high velocity to the turbine wheel 9, said velocity being approximately 20,000 r.p.m. Air turbines of this general type are well-known in the art. It is, however, an important feature of this invention that the turbine is so designed that its overall diameter is large as compared to its thickness (see Figs. 6 and 7) and that the turbine is located in the head of the knife assembly rather than in the handle as in the devices heretofore known. The turbine with its cover plate mounted thereon is shown at 10 in Figure 3. It is also an important feature of this invention that said turbine is so arranged in the head that its axis of rotation 11 is parallel to the shaft 4, the latter being the axis of rotation of the cutting knives 1 and 2.

The turbine wheel 9 is mounted on a shaft 11 and the shaft 11 is mounted in roller bearings 27 and 28 (see Fig. 4). These bearings 27 and 28 are contained in the head 3 and in the turbine cover plate 10 respectively. The shaft 11 projects through the turbine cover plate 10 and extends outwardly therefrom such that a driving gear 13 can be mounted thereon. (Figs. 3–5.) It can readily be seen that the driving gear 13 rotates at the same speed as the turbine wheel 9 and since the optimum speed of the turbine wheel is approximately four times greater than the optimum speed of the cutting elements, it is necessary to provide a speed reducer between the two. It is an important feature of this invention that the mechanical parts are so designed and so arranged with respect to each other that the means of connecting the driving gear 13 to the knife elements are also made to serve as such a speed reducer, as will be explained hereinafter.

Referring to Fig. 9 the cutting disc 1 has a shoe 14 mounted thereon by the pin 15 and the cutting disc 2 has a shoe 16 mounted thereon in similar fashion by the pin 17. It will be noted that the cutting disc 1 has an opening 18 (Fig. 8) sufficiently large so that the disc 1 can be assembled over the pin 17 and shoe 16 and such that there is free access to the roller bearing 19. The cutting disc 2 also has an opening 29 so as to permit access to the bearing 19. The shoes 14 and 16 are arranged so as to be in the same plane and both are so mounted on the pins 15 and 17 respectively that they are free to rotate about said pins. (The design of the shoes 14 and 16 is best shown in Figs. 5, 8 and 9.) Rollers could be used rather than the shoes described herein but they are less satisfactory from the standpoint of noise, vibration and wear.

The gear 20 (Figs. 3–5 and 10–11) is smooth on one face and has an annular eccentric track or recess 21 cut into the opposite face. The track 21 has a constant depth and a constant width but is cut so as to be eccentric with respect to the shaft 22, the latter being integrally mounted on that face of the gear which has the track 21 cut therein and being located at the center of said face. There is also a shaft 23 mounted on the smooth face of the gear 20 (see Fig. 4) and on the same axis as the shaft 22. The track 21 is of a width slightly greater than the width of the shoes 14 and 16 and the gear 20 is so mounted that the shoes 14 and 16 are contained within said track such that when the gear 20 is rotated the eccentric track 21 functions as a cam while the shoes 14 and 16 function as cam followers.

The shaft 22 of the gear 20 is mounted in roller bearing 24 (see Fig. 4) which is set in the head 3 while the shaft 23 is mounted in roller bearing 25 which is set in the removable cover plate 30. The gear 20 is so mounted that it not only cooperates with the shoes 14 and 16 but it also cooperates with the driving gear 13 so as to be driven by the latter. The diameter of the gear 20 is designed to be four times that of the driving gear 13 and thus the gear 20 also functions as a speed reducer as it transmits power to the cutting elements 1 and 2.

It will now be understood that if air under pressure is introduced through the hollow handle 26 to the turbine air inlet 7 (Fig. 6) so as to drive the turbine wheel 9 and the driving gear 13, then the combination gear-cam 20 will rotate at an appropriately reduced speed and the shoes 14 and 16 which are contained within the eccentric track 21 will be oscillated back and forth by the walls of said track such that the cutting elements 1 and 2 will be oscillated in opposite directions about the shaft 4. The track 21 is so designed that the oscillating motion imparted to the cutting elements 1 and 2 will be such as to cause a sufficient number of cutting teeth to travel across each other so as to sever that which is between them.

It will now be further understood that by using as the driving means an air turbine which is comparatively large in diameter and small in thickness and by locating said turbine in the head of the cutting tool in close proximity to the cutting elements 1 and 2 it is possible to eliminate many small precision parts such as are ordinarily found in flaying knives of this type. Because the turbine rotates about an axis parallel to the axis of rotation of the cutting blades the blade actuating means can be simplified and yet made more efficient and more durable.

The shoes 14 and 16 should be approximately ¾" long and ½" wide. By using shoes of such substantial size to actuate the cutting elements 1 and 2 and by actuating said shoes by means of an eccentric track 21 which has an outer and inner wall to guide said shoes, it is possible to achieve unusually smooth operation of the cutting elements with a minimum of vibration.

As previously mentioned a significant feature of the flaying knife embodying the present invention is that it requires an unusually small number of moving parts such that said parts may be of comparatively large size and sturdy construction and yet be combined to form a knife assembly which is substantially equal in weight to those flaying knives now in use.

This invention can, of course, be applied in various ways and the present description should therefore be regarded as disclosing only an illustrative embodiment of the invention from which no unnecessary limitations should be implied.

We claim:

1. A mechanical flaying knife for skinning cattle and the like, comprising: a cutting head with a handle portion attached thereto; two flat disc-shaped cutting blades arranged face to face and mounted for oscillation on a blade shaft within said cutting head; a drive shaft rotatably mounted within said cutting head perpendicular to the plane of said cutting blades; a driving gear fixedly mounted on said drive shaft for rotation therewith; a gear cam mounted on a gear shaft parallel to said drive shaft and positioned to mesh with said driving gear so as to be driven thereby, said gear cam having an eccentric annular track formed in one face thereof; and a pair of cam followers disposed within said annular track, one connected to each of said blades respectively, said followers being positioned symmetrically with respect to said blade shaft and spaced apart substantially less than 180 degrees whereby rotation of said drive shaft will effect oscillation of said blades.

2. A mechanical flaying knife of the type set forth in claim 1 where said cam followers comprise shoes having arcuate inner and outer surfaces shaped to conform to the configuration of the inner and outer walls respectively of said annular track.

3. A mechanical flaying knife of the type set forth in claim 1 where said cam followers are spaced apart approximately 90 degrees.

4. A mechanical flaying knife of the type set forth in claim 1 where the diameter of said gear cam is substantially larger than the diameter of said driving gear so as to provide an appropriately reduced speed of oscillation for said blades.

5. A mechanical flaying knife for skinning cattle and the like, comprising: a cutting head with a handle portion attached thereto; two flat disc-shaped cutting blades arranged face to face and mounted for oscillation on a blade shaft within said cutting head; a drive shaft rotatably mounted within said cutting head perpendicular to the plane of said cutting blades; a driving gear fixedly mounted on said drive shaft for rotation therewith; a gear cam, substantially greater in diameter than said driving gear, mounted on a gear shaft parallel to said drive shaft and positioned to mesh with said driving gear so as to be driven thereby, said gear cam having an eccentric annular track formed in one face thereof; and a pair of shoes having arcuate inner and outer surfaces shaped to conform to the configuration of the inner and outer walls of said track disposed within said track and connected to said blades respectively, said shoes being positioned symmetrically with respect to said blade shaft and spaced apart approximately 90 degrees.

References Cited in the file of this patent

UNITED STATES PATENTS

| | | |
|---|---|---|
| 1,221,292 | Cribbs | Apr. 3, 1917 |
| 1,507,716 | Redman | Sept. 9, 1924 |
| 2,270,596 | Medlen | Jan. 20, 1942 |
| 2,292,453 | La Mere | Aug. 11, 1942 |
| 2,559,725 | Mansperger | July 10, 1951 |
| 2,565,878 | O'Neilly | Aug. 28, 1951 |
| 2,630,628 | Hall | Mar. 10, 1953 |
| 2,725,628 | O'Neilly | Dec. 6, 1955 |

FOREIGN PATENTS

| | | |
|---|---|---|
| 977,702 | France | Nov. 15, 1950 |